Jan. 30, 1968 W. HUNGER 3,366,399

AXLE-ACTUATING DEVICE

Filed Dec. 20, 1965 3 Sheets-Sheet 1

*INVENTOR.*

W. Hunger

*BY*

Richards & Geier

ATTORNEYS

INVENTOR.
W. Hunger
BY
Richards & Geier
ATTORNEYS

AXLE-ACTUATING DEVICE

Filed Dec. 20, 1965 3 Sheets-Sheet 3

INVENTOR.

BY W. Hunger

Richards & Geier

ATTORNEYS

United States Patent Office 3,366,399
Patented Jan. 30, 1968

1

3,366,399

AXLE-ACTUATING DEVICE

Walter Hunger, Rodenbacherstrasse 50,
Lohr am Main, Germany

Filed Dec. 20, 1965, Ser. No. 514,954
Claims priority, application Germany, Dec. 19, 1964,
H 54,649
5 Claims. (Cl. 280—104.5)

ABSTRACT OF THE DISCLOSURE

A device for raising and lowering one of the two rear axles of a vehicle includes a swingable support connected by springs with the two axles, a combined pump and raising device connected to the rearmost of the two rear axles, a pumping device connected with the other axle and with said combined pump and raising device and an oil container connected with both devices. The combined pump and raising device includes a cylinder with a piston and a piston rod movable therein, the piston rod carrying a head movable in an equalizing chamber of the cylinder which communicates with the oil container.

This invention relates to vehicles having three wheel-carrying axles, whereby two of these axles are arranged as a pair close to each other and usually constitute the rear axles of the vehicle; the invention is particularly concerned with a device for raising and lowering one of this pair of axles depending upon the load of the vehicle.

When a vehicle of this type is moving while being empty, these two axles which are not subjected to a full load, often carry out a so-called trampling movement which is not only detrimental to the axles and their bearings, as well as other parts of the vehicle, but damages the road as well. These drawbacks can be diminished or avoided by raising one of these two axles since then the spring suspension becomes softer and only one axle is subjected to stress.

In prior art mechanical means were provided for raising the rear one of these two axles when the vehicle is moving without load, so that then only the front one of these two axles would carry the entire part of the load normally directed to the pair of axles. In such devices the raising or lowering of the axle is carried out at the discretion of the driver. Therefore, the drawback of these devices is that if the driver does not pay sufficient attention or acts improperly for other reasons, the permissible axle load can be exceeded. Furthermore, it is necessary to observe the loading very closely so that in many instances for reasons of safety the second axle is lowered although this is not required as yet by the actual load. The tires are then subject to additional wear. Furthermore, it is desirable that an axle be raised as soon as the load upon the other axle has dropped below the permitted limit, since this provides a better turning capacity for the vehicle.

An object of the present invention is to eliminate these drawbacks of prior art constructions through the provision of an axle raising device which will operate automatically depending upon the load of the vehicle.

Other objects of the present invention will become apparent in the course of the following specification.

The present invention proceeds from the consideration that when one axle has been raised, excessive load upon the other unraisable axle must be avoided by automatically lowering the raised axle as soon as the permissible pressure limit upon the axle has been reached. However, in case of a particularly difficult ground it may be desirable, in order to provide a better engagement of the wheels of the driving axle with the ground, that a certain amount of overload be permitted for a short period; this can be attained by providing an adjustable time delay in the release of the automatic lowering mechanism.

2

A characteristic feature of the present invention resides in the provision of a hydraulic actuating device combined with steering means and operable automatically depending upon load conditions for raising and lowering one of said pair of axles.

It may be also advantageous to construct the hydraulic raising device so that it constitutes, in addition a pumping device. According to a preferred embodiment the working point of one or several raising cylinders is located within the range of the axle to be raised. An operating cylinder is located within the range of the other axle and its transmitting conduits are so arranged that when the load upon the axle is below a predetermined permissible pressure, the pressure medium can be transmitted to the raising cylinder to raise the movable axle.

Furthermore, it may be advantageous to provide in a common cylinder a raising piston which is movable in a raising cylinder, whereby the piston actuates a piston rod pivoted to the axle carrier. The end of the piston rod extending outside of the piston carries a head which slides in an equalizing chamber of the common cylinder. A conduit for the pressure medium opens into the raising cylinder below the piston, the equalizing chamber being connected with a conduit transmitting the pressure medium. Due to this arrangement the piston rod can adjust itself during percussions of the moving vehicle.

In a construction of this type a further advantage can be attained by providing a tubular outer space in the common casing, which is connected through a preferably adjustable throttle member with the conduit transmitting the pressure medium to be stored. The throttle member has preferably the form of an adjustable conical pin which is movable in an opening formed in the casing so as to provide an adjustable annular passage.

A further advantageous construction of the present invention may consist in that piston rod of the raising piston is so shaped in the area of the common cylinder that it forms a transmitting chamber which is included in the means transmitting the pressure medium, separate valves being included in the inlet and outlet sections of this transmitting chamber.

The invention will appear more clearly from the following detailed description when taken in connection with the accompanying drawings showing by way of example, a preferred embodiment of the inventive idea.

Figure 1:
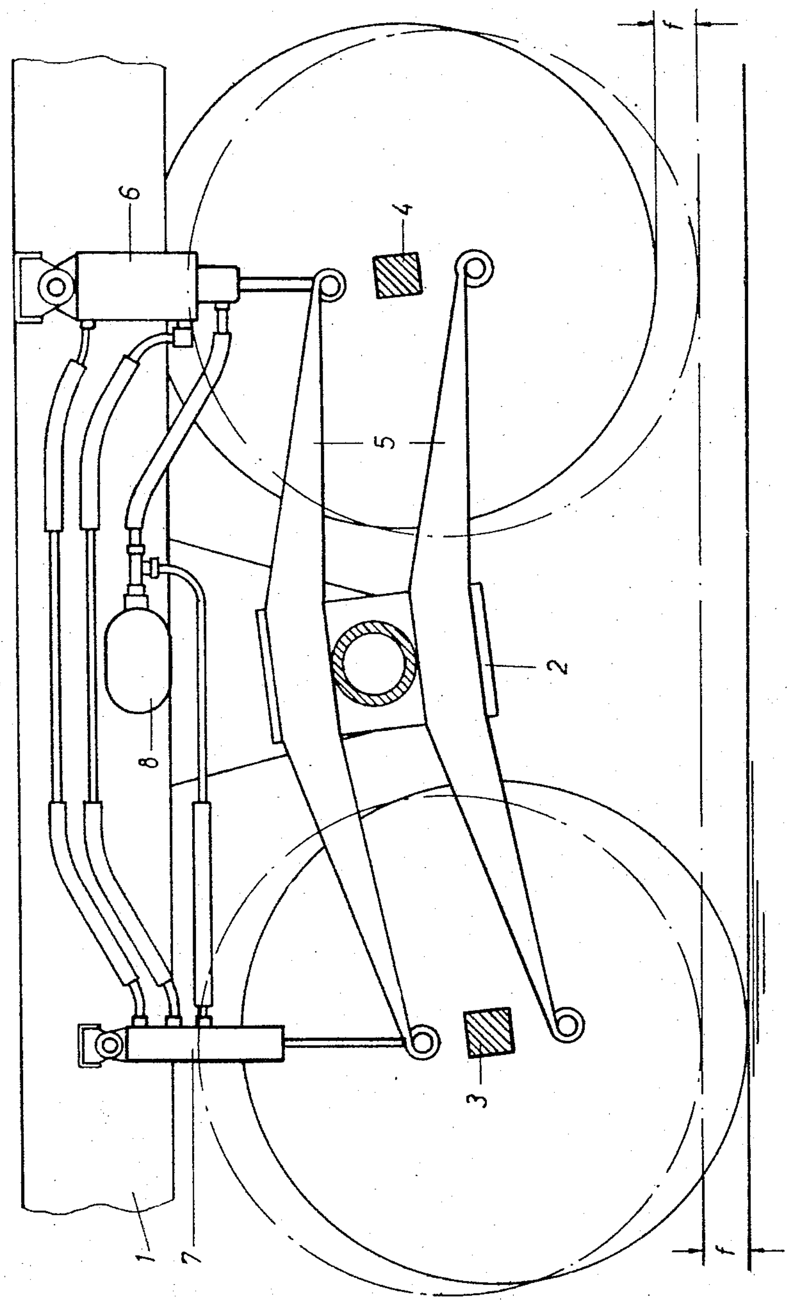
FIGURE 1 is a diagrammatic side view of the aggregate supporting a pair of axles, some parts being shown in section.

FIG. 1 of the drawings shows a frame 1 of a vehicle which carries a horizontally rotatable support 2, connected with the axles 3 and 4 by elongated springs 5. A cylindrical device 6 has the double function of serving as a raising device and as a pump. The device 6 is connected with the axle 4 which is the rear axle relatively to the pair of axles 3, 4 as far as the direction of movement of the vehicle is concerned. The cylindrical device 6 can raise the axle 4 above ground from the position shown by broken lines to the position shown in full lines, the extent of movement being indicated by *f* in FIG. 1. The front axle 3 of the pair can be assumed to be lowered to the same extent, or the vehicle can be assumed to be swung about the center of the aggregate supporting the pair of axles. The rising force of the device 6 corresponds approximately to the permissible load upon an axle.

A pumping cylindrical device 7 is used to actuate the raising device. The device 7 is connected with the axle 3. The connection of the device 6 with the axle 4 may also constitute the connection of the ends of springs 5 with the axle 4. Similarly, the connection of the device 7 with the axle 3 may also constitute the connection of the ends of springs 5 with the axle 3. During a loadless run the cylinder 7 transmits oil under pressure from a container 8 to the raising device 6 through conduits shown in FIG. 1.

The pumping cylinder 7 is provided with other conduits which will transmit oil to the raising device 6 so as to actuate it when the load upon the axle 3 is below a predetermined amount.

Figure 2:
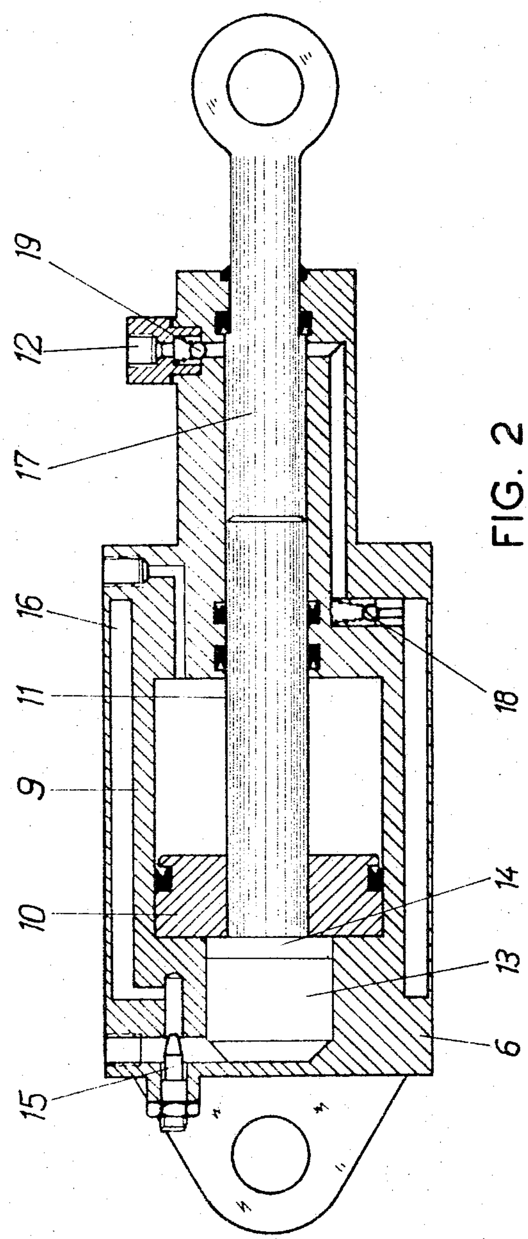
FIGURE 2 is a longitudinal section through an axle raising device of the present invention showing it in the raised position.
Figure 3:
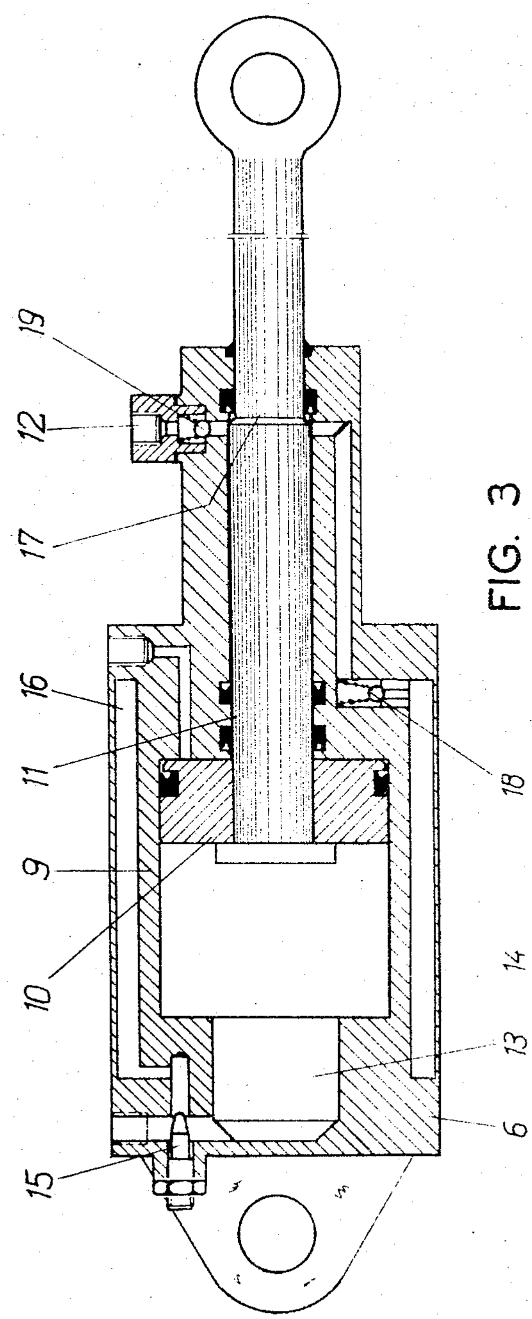
FIGURE 3 is similar to FIG. 2 but shows the same device in the lowered position.

FIGS. 2 and 3 show a particularly advantageous double use of the hydraulic raising device 6 serving also as a pump. A cylindrical casing 9 encloses a piston 10 which is movable therein and which carries a piston rod 11 extending beyond the cylinder and carrying at its front end a head 14. The head 14 is slidable in an equalizing chamber 13. As shown in the drawings, an inlet provided in the cylinder 9 below the piston 10 is used to receive pressure medium transmitted from the container 8.

The piston rod 11 is provided with a narrower extension 17 so as to form a transmitting chamber within the casing 9. The movements of the parts 11, 17 of the piston rod having different diameters produce a pumping effect in the conduit 12 for the pressure medium, the transmission of the pressure medium being regulated by spring loaded check valves 18 and 19. The pressure medium flows from the conduit 12 through the valves 19 and 18 into a tubular outer chamber 16 enclosed by the casing 9 and then flows through an outlet with an adjustable throttle member 15 having the shape of a movable conical pin. Then the pressure flows into a conduit connected to the container 8 and also connected with the equalizing chamber 13 into which the rod head 14 of the rod 11 can move in case of impacts or considerable unevennesses of the ground.

FIG. 2 shows an operative position in which the axle 4 has been raised by introducing pressure oil under the piston 10. In the case of maximum load on the front axle 3 after spring actuation the pumping cylinder 7 opens the connections of the cylinder 6 and permits the return flow of pressure oil into the container 8.

It is apparent that the example described above has been given solely by way of illustration and not by way of limitation and that it is subject to many variations and modifications within the scope of the present invention.

All such variations and modifications are to be included within the scope of the present invention.

What is claimed is:

1. In a vehicle having a pair of axles, a hydraulic raising device connected with one of said axles for raising and lowering said one axle, and an actuating device connected with said hydraulic raising device for actuating said hydraulic raising device depending upon the load carried by the vehicle and comprising a pumping cylinder connected to the other one of said axles and having conduits for transmitting hydraulic pressure medium into said hydraulic raising device to actuate said hydraulic raising device when the load upon said other axle is below a specific amount to raise said one axle.

2. An apparatus in accordance with claim 1, further comprising a receptacle for the hydraulic pressure medium, and conduits connecting said receptacle with said hydraulic raising device and said actuating device, wherein said hydraulic actuating device comprises a cylinder, a piston reciprocable within said cylinder, a piston rod connected with said piston and having an end extending beyond said cylinder and connected with said one axle, a head connected with the other end of said piston rod and adapted to be moved into an equalizing chamber formed in said cylinder, one of the conduits connected with said receptacle communicating with an inlet formed in said cylinder below said piston, another one of the conduits connected with said receptacle communicating with an outlet formed in said cylinder and communicating with said equalizing chamber.

3. An apparatus in accordance with claim 2, wherein said cylinder has a tubular outer chamber, said outlet communicating with said tubular outer chamber, and a throttle member located in said outlet.

4. An apparatus in accordance with claim 3, wherein said throttle member consists of an adjustable conical pin movable in said outlet to form a variable passage of annular cross-section for the hydraulic pressure medium.

5. An apparatus in accordance with claim 3, wherein the portion of the piston rod adjacent its first-mentioned end is recessed to form an annular chamber within said casing, said annular chamber having an inlet communicating with one of said conduits and an outlet communicating with said tubular outer chamber, and separate valves located in the last-mentioned inlet and outlet.

References Cited

UNITED STATES PATENTS 2,599,043 6/1952 Bissell ---------- 280—104.5

BENJAMIN HERSH, *Primary Examiner.*

PHILIP GOODMAN, *Examiner.*